A. VREELAND.
Cart-Loading Scoops.
No. 145,320. Patented Dec. 9, 1873.
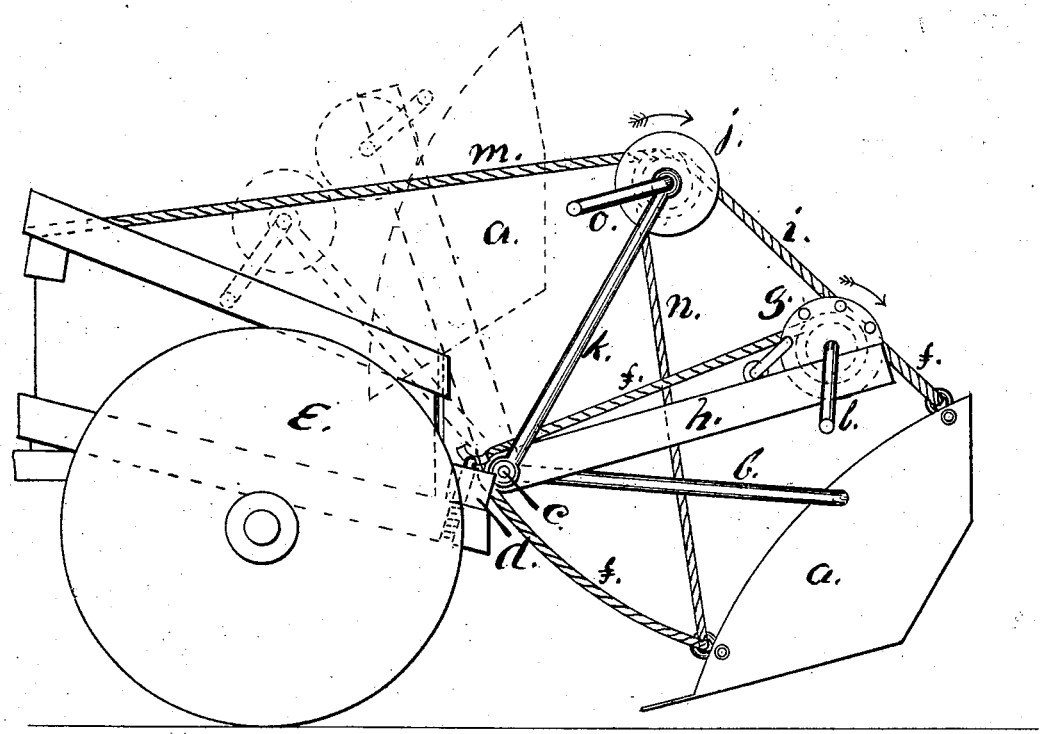
Witness.
Horace Harris.
John Craig.
Inventor.
Aaron Vreeland.

UNITED STATES PATENT OFFICE.

AARON VREELAND, OF MONT CLAIR, NEW JERSEY.

IMPROVEMENT IN CART-LOADING SCOOPS.

Specification forming part of Letters Patent No. 145,320, dated December 9, 1873; application filed September 26, 1873.

*To all whom it may concern:*

Be it known that I, AARON VREELAND, of Mont Clair, in the county of Essex and State of New Jersey, have invented an Improved Cart-Loading Scoop, of which the following is a specification:

The object of my invention is to reduce the labor and time required in loading a cart by the ordinary process of shoveling, and also to furnish a better machine for loading a cart than any other one I have seen.

My invention, in the first part, consists of an adjustable scoop, $a$, which, by the rods $b$, one on each side, is hung to a joint-pin, $c$; and this joint-pin, by the piece $d$, or other equivalent means, is attached to the rear end of the cart $e$; but it is so attached that when the cart is full it may be readily detached, leaving the cart to be drawn away for unloading, and the scoop may be hitched onto another cart. To the rear end of the scoop, on either side, is secured a chain or rope, $f$, running from thence up to the swing-windlass $g$, and, after being made fast to the side of the windlass, the rope passes onto and over the joint-pin, and thence down to the front end of the scoop. The supports $h$ of this windlass turn on the joint-pin. This windlass is connected with the swing-windlass $j$ by the ropes $i$ and the supports $k$ of the windlass $j$, which also turn on the joint-pin.

The scoop, thus hung to the windlasses and the joint-pin, is loaded by an operator on each side turning the cranks $b$ in the direction shown by the dart. This turning inclines the front end of the scoop into the earth, where it is held by holding onto these cranks, and the cart being made to move along it is filled, and when full the cranks are turned back and the scoop assumes a level position.

The second part of the invention—that for emptying the scoop into the cart—is now called into use, which consists of the windlass $j$, the ropes $m$, one on each side, fast to said windlass, and running forward to the front end of the cart, the ropes $n$, one on each side, with one end fast to this windlass and the other to the front end of the scoop, and also of the ropes $i$ before named, connecting the windlasses $g$ and $j$.

The emptying of the scoop into the cart is now effected by the operators, one on each side, turning the cranks O in the direction indicated by the dart. At first, in winding up the ropes on the windlass $j$, the scoop is lifted up to a level with the top of the cart, and then it is drawn forward over the cart, and finally is emptied into it. After being emptied, the scoop, by the hands of the operators, is again placed in position for another load, or it is left in the cart when being transported from one place to another. The dotted lines over the cart show the scoop in this position.

The scoop is thus filled and emptied by means of the two windlasses and their appliances, and it is believed that thereby great advantage is gained over other cart-loading devices.

I claim—

The scoop $a$, connected with and operated by the swing-windlasses $g$ and $j$, substantially as and for the purposes specified.

AARON VREELAND.

Witnesses:
HORACE HARRIS,
JOHN CRAIG.